(No Model.)
F. K. HESSE.
LANTERN OR OTHER CARRIER FOR BICYCLES.
No. 538,965. Patented May 7, 1895.
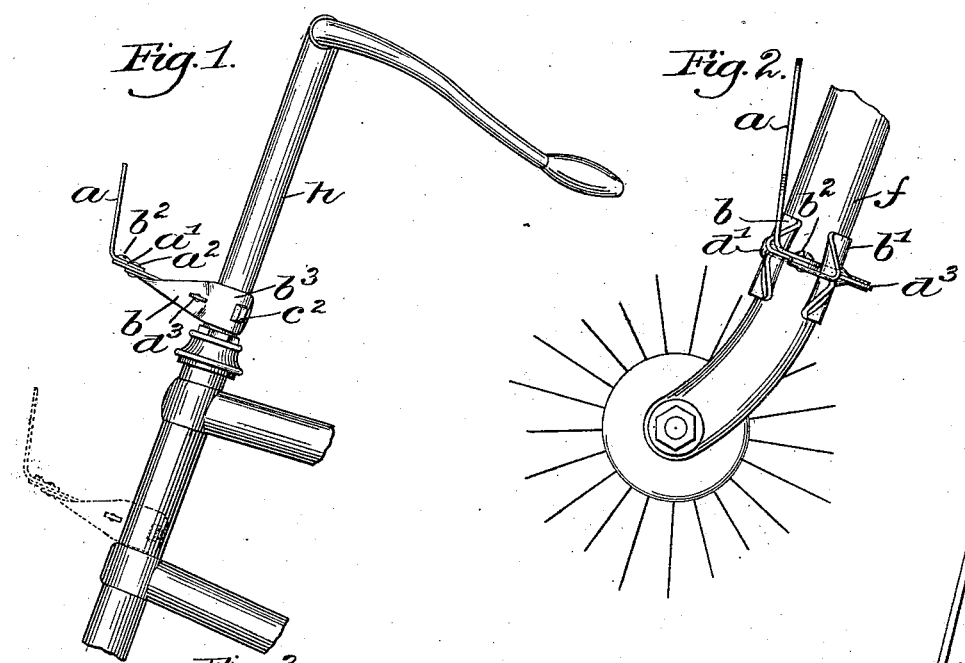
Witnesses.
Louis N. Gowell
Thomas J. Drummond
Inventor.
Frank K. Hesse,
By Crosby & Gregory
attys.
THE NORRIS PETERS CO., PHOTO-LITHO., WASHINGTON, D. C.

United States Patent Office.

FRANK K. HESSE, OF BOSTON, MASSACHUSETTS, ASSIGNOR TO CODMAN & SHURTLEFF, OF SAME PLACE.

LANTERN OR OTHER CARRIER FOR BICYCLES.

SPECIFICATION forming part of Letters Patent No. 538,965, dated May 7, 1895.

Application filed January 9, 1894. Serial No. 496,234. (No model.)

*To all whom it may concern:*

Be it known that I, FRANK K. HESSE, of Boston, county of Suffolk, State of Massachusetts, have invented an Improvement in Lantern or other Carriers for Bicycles and the Like, of which the following description, in connection with the accompanying drawings, is a specification, like letters on the drawings representing like parts.

This invention has for its object to provide a novel and improved lantern or other carrier for bicycles and the like.

In accordance with my invention the carrying member is pivotally attached to one or more supporting members, which latter are adapted to be secured to the handle-bar post, frame or fork, of the bicycle or other vehicle to which the carrier is to be applied. By pivoting the carrying member to its supporting member or members I am enabled to apply the latter to any part of the machine and still be able to turn the carrying member into proper position to face the lantern in the desired direction.

My invention also comprehends the use of two supporting members connected by a hinge joint in order that they may be readily opened to span or embrace the handle-bar post, fork or other part of the machine frame, means being provided by which to clamp the said members together in supporting position.

In the preferred construction the two supporting members are clamped together by means of a clamping device permanently carried by one of the members and which is readily attached to and detached from the other of said members, as will be more fully hereinafter described.

In the drawings, Figure 1 represents a handle-bar post of a bicycle, together with a portion of the frame, my improved carrier being attached to the said post in usual position, said figure also showing the carrier in dotted lines applied to the frame lower down, near the fork. Fig. 2 shows my improved carrier applied to the fork of the bicycle close down to the hub of the wheel. Fig. 3 is a top or plan view of a carrier embodying my invention; Fig. 4, a side view thereof; and Fig. 5, a cross-sectional detail on the dotted line $xx$, Fig. 3, showing the preferred manner of attaching the false clamping-faces to the supporting members.

Referring to the drawings, $a$ is the carrying member of suitable shape, construction and material to adapt it for carrying the particular desired article, whether lantern or article of baggage, said carrier as shown, having its lower end $a'$ turned at an angle and pivoted upon a rivet or screw $a^2$, the same in the present instance of my invention constituting the pivot by which the supporting members $b, b'$, are jointed or hinged together. The supporting members $b, b'$ may be of suitable or desired construction, the said members in the present instance being formed from thin sheet metal, as steel, given a partial twist, as shown, in order that their clamping ends may stand perpendicular to their hinge ends.

One of the clamping members, as $b'$ for instance, is made of suitable size at its hinge end to receive a screw $b^2$ passing through a slot $a^3$ in the end $a'$ of the carrying member, said screw $b^2$ constituting a preferred form of clamping device to lock the carrying member in adjusted position on and with relation to the supporting members.

The supporting members $b, b'$, at their ends opposite the hinge joint $a^2$ are curved, as at $b^3$, to more nearly conform to the usual shape of the handle-bar post, frame or fork to which the carrier is to be applied, the said curved ends $b^3$ being preferably provided at their inner sides with false contact faces $c$, shown in section Fig. 5, and preferably of leather or other suitable yielding substance in order that the said supporting members may better grip the part of the bicycle to which the carrier is to be applied and to prevent marring said part.

The false contact faces $c$ are preferably attached to their respective supporting members in such manner as to permit them to be readily detached therefrom when the said supporting members are to be cleaned, the said faces in the present instance being provided with staple-like fastening devices $c'$ clinched at the inner or contact sides of the said faces, the crowns $c^2$ of the said faces projecting beyond the opposite sides of the said false faces and made bulging as shown.

To apply the false faces to the supporting members the bulging crowns $c^2$ of the said devices are inserted through holes $c^3$ in the supporting members, the friction of the resilient crowns in the holes, together with the enlarged or bulging portion of the crowns protruding at the opposite sides of the supporting members, serving to retain the said false faces firmly in operative position.

When it is found necessary to clean the device the false faces may be readily removed by lifting the same from their respective supporting members, the bulging crowns readily yielding to permit the faces to be removed.

Any suitable device may be employed for clamping the supporting members together embracing the part of the machine to which the carrier is to be applied. I prefer, however, to employ a device such as shown in the drawings and consisting of the threaded bolt $d$ having a flattened head $d'$ adapted to be inserted through a horizontal slot $d^2$ in one of the supporting members, as the member $b'$, the said bolt having its opposite threaded end extended through a suitable hole in the other supporting member $b$, to receive outside the latter the clamping nut $d^3$. See Fig. 2.

The hole in the member $b$ is too small to permit the head $d'$ of the bolt to be drawn through, and the said bolt is, therefore, permanently attached to the member $b$, the head $d'$ preventing its withdrawal in one direction and the clamping nut $d^3$ in an opposite direction.

To apply the carrier to the bicycle the nut $d^3$ is slackened sufficiently to permit the head $d'$ to be turned into a horizontal position, as shown by dotted lines Fig. 4, when the said head may be readily drawn through the said opening $d^2$ and the two supporting members spread into their dotted position Fig. 3, to permit them to be applied to the handle-bar post, frame or fork as desired. The two supporting members having been turned together toward each other embracing the part of the machine which is to serve as the support, the head $d'$ of the bolt $d$ is again inserted through the opening $d^2$ in the member $b'$ to the outside of the latter, and turned into a vertical position, as in full lines Fig. 4, crossing the line of said opening and preventing the bolt being drawn back, after which the two members are clamped together by means of the nut $d^3$.

To loosen or remove the carrier it is not necessary to run the nut $d^3$ off from the end of the bolt as would be necessary if the head $d'$ of the bolt could not be drawn through its member $b'$, for in my invention the nut $d^3$ is slackened sufficient only to enable the head $d'$ to be turned into a horizontal position when it may be drawn through the opening $d^2$ in the member $b'$ and the members opened, as in dotted lines Fig. 3. By means of this construction much time is saved in applying the device to and removing it from the machine, and it is impossible to lose the clamping device as it remains always with the member $b$.

In Fig. 1, I have shown my improved carrier as applied in the usual position to the handle-bar post $h$ of the bicycle. If when the supporting members are clamped to the said post it is found that the carrying member is twisted slightly and turns the lantern out of its proper line the screw $b^2$ may be slackened and the said member $a$ turned about its pivot $a^2$ to bring the lantern into proper alignment. A further and perhaps more important advantage gained by pivoting the carrying member to the supporting member or members is illustrated by Fig. 2.

It is well understood by those accustomed to ride bicycles at the present time that it is very desirable to concentrate all the weight possible at or near the axles of the wheels in order to lower the center of gravity. My improved carrier permits the lantern to be applied either to the handle bar post, frame or to the fork, for by applying the supporting members to one arm of the fork $f$ of a machine, as in Fig. 2, so that the said members project laterally therefrom, and by slackening the bolt $b^2$, the carrying member $a$ may still be turned into such a position as will direct the rays of light from the lantern in a forward direction or into the path of movement of the machine.

While the lantern itself is not of very considerable weight, yet in practice it is found that transferring the lantern from the elevated position Fig. 1 on the handle-bar post to the much lower position Fig. 2 on the fork, makes a perceptible difference in the stability of the machine. Hence the advantage of a construction such as my invention provides which will enable the lantern to be placed in either position desired.

Instead of placing the carrier upon the fork as shown in Fig. 2, the same may be placed upon the frame as for example in the position shown by dotted lines Fig. 1, immediately above the fork, or the said carrier may be applied to any other part of the machine or frame as desired, the hinged supporting members, together with the pivoted carrying member enabling said carrier to be applied to any part, whatever its size or location, and the lantern faced in the desired direction.

While I have herein shown and described my invention as particularly adapted for use in supporting or carrying a lantern, yet it is evident that the carrying member $a$ may be adapted to receive or carry any article of baggage, parcels, or the like which the rider may see fit to take with him.

This invention is not limited to the particular construction or arrangement of parts herein shown, for it is evident the same may be varied without departing from the spirit and scope of the invention.

In the claims I have specified a retaining device independent of the pivot or hinge which connects the two supporting members, and by the term "independent" is meant any retaining device which may be loosened without loosening the pivot or hinge, as distinguished from a combined pivot and retaining device, which, when loosened to permit the members to be moved, also loosens the pivot so that the members cannot be properly and accurately adjusted.

Having described my invention, and without restricting myself to details, what I claim, and desire to secure by Letters Patent, is—

1. A carrier of the class described, consisting of two supporting members hinged together at one of their ends and adapted to be clamped together embracing a support, their clamping ends standing in planes substantially parallel to the axis of the hinge pivot, a carrying member pivoted to said supporting members by the hinge pivot, a retaining device independent of said pivot to clamp said carrying member in adjusted position, and means to clamp the said supporting members together embracing said support, substantially as described.

2. The herein described carrier, the same consisting of two flat metal supporting members hinged together at one of their ends and twisted to bring their opposite clamping ends in plane substantially parallel to the axis of the pivot of said hinge to embrace between them a suitable support, a carrying member pivoted to said supporting members by the hinge pivot, a retaining device independent of said pivot to clamp the said carrying member in adjusted position, and a clamp bolt to clamp the said supporting members together embracing said support, substantially as described.

3. In a carrier of the class described, the combination with a carrying member, of supporting members therefor provided with holes, a hinge joint connecting said members, means to draw said members toward each other, false clamping faces, and staple like fastening devices therefor adapted to enter said holes, substantially as and for the purpose specified.

4. In a device of the class described, the combination with a carrying member and two supporting members therefor, one provided with an elongated opening, of a clamping bolt as $d$ having a flattened head passed through said elongated opening and turned crosswise thereof, and its opposite threaded end passed through a hole, smaller than said head, in the other of said members; and a clamping nut upon said threaded end to draw said members together, loosening of said nut permitting said bolt to be partially rotated to enable its flattened head to be drawn through the elongated opening in and thereby disengaged from the member containing said opening, said bolt being, however, still retained by the other of said members except when said nut is removed, substantially as described.

In testimony whereof I have signed my name to this specification in the presence of two subscribing witnesses.

FRANK K. HESSE.

Witnesses.
FREDERICK L. EMERY,
AUGUSTA E. DEAN.